United States Patent
Mould et al.

(10) Patent No.: US 6,856,871 B2
(45) Date of Patent: Feb. 15, 2005

(54) METHOD FOR COMPENSATING STEERING-TORQUE DISTURBANCES

(75) Inventors: Mike Mould, Leverkusen (DE); Peter Redlich, Cologne (DE)

(73) Assignee: Ford Global Technologies, LLC, Dearborn, MI (US)

(*) Notice: Subject to any disclaimer, the term of this patent is extended or adjusted under 35 U.S.C. 154(b) by 25 days.

(21) Appl. No.: 10/352,665

(22) Filed: Jan. 28, 2003

(65) Prior Publication Data

US 2003/0158642 A1 Aug. 21, 2003

(30) Foreign Application Priority Data

Jan. 28, 2002 (EP) .............................. 02100060

(51) Int. Cl.$^7$ .............................................. B62D 5/04
(52) U.S. Cl. .......................... 701/41; 701/38; 180/421
(58) Field of Search .............................. 701/41, 38, 72, 701/33, 48, 88, 89, 90; 180/420, 421, 426, 428, 443, 446; 388/831; 703/41, 38, 72; 74/388 PS

(56) References Cited

U.S. PATENT DOCUMENTS

| | | | | |
|---|---|---|---|---|
| 4,681,181 A | * | 7/1987 | Shimizu | 180/446 |
| 4,745,984 A | * | 5/1988 | Shimizu | 180/446 |
| 4,770,265 A | * | 9/1988 | Allen | 180/415 |
| 4,837,692 A | * | 6/1989 | Shimizu | 701/41 |
| 5,000,278 A | * | 3/1991 | Morishita | 180/446 |
| 5,040,629 A | * | 8/1991 | Matsuoka et al. | 180/446 |
| 6,295,496 B1 | | 9/2001 | Shinmura et al. | |

FOREIGN PATENT DOCUMENTS

| | | |
|---|---|---|
| DE | 198-21-163 A1 | 5/1998 |
| DE | 100-11-639 A1 | 3/2000 |
| DE | 100-44-205 A1 | 9/2000 |
| WO | WO 99/24307 | 5/1999 |

\* cited by examiner

*Primary Examiner*—Thomas G. Black
*Assistant Examiner*—Arthur D. Donnelly
(74) *Attorney, Agent, or Firm*—Raymond L. Coppiellie

(57) ABSTRACT

The invention relates to a method for compensating steering-torque disturbances caused by unequal torque distribution at the front wheels of a motor vehicle with front-wheel drive or all-wheel drive and an active differential. In this arrangement, the magnitude of the steering-torque disturbance is determined from the torque distribution, the total torque and the steering lever and a compensation torque is exerted on the steering system by means of an active steering-servo device.

4 Claims, 1 Drawing Sheet

METHOD FOR COMPENSATING STEERING-TORQUE DISTURBANCES

BACKGROUND OF THE INVENTION

1. Field of the Invention

Figure 1:
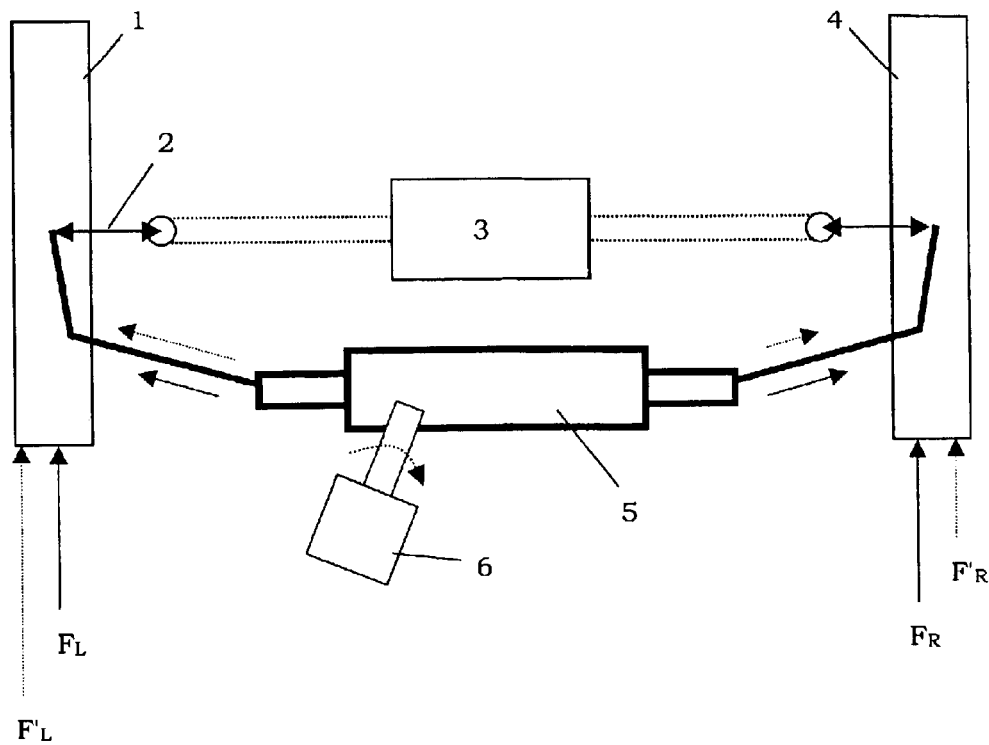

The invention relates to a method for compensating steering-torque disturbances on a motor vehicle with front-wheel drive or all-wheel drive and an active differential at the front wheels and with an active steering-servo device.

2. Description of the Related Art

When torques of unequal magnitude act on the two steerable front wheels of a motor vehicle, these are fed back into the steering system by the steering lever and produce unwanted steering-torque disturbances. In the case of a motor vehicle with front-wheel drive or all-wheel drive and a conventional differential in the drive line, the differential essentially ensures drive torques of equal magnitude at both front wheels, and the steering-torque disturbances are thus no problem. In the case of locking differentials, however, unequal distribution of the drive torque between the two front wheels may be performed deliberately in order to counteract spinning of one wheel on a slippery underlying surface. In this case, the steering-torque disturbances described above occur, and being felt in an unpleasant way by the driver.

In this context, DE 42 27 805 A1 has disclosed a control system for a locking differential in which a limiting torque may be exerted on the differential when cornering, depending on load distribution between the inner and outer wheels. Moreover, an auxiliary force is exerted by a device for active steering assistance. In this case, control is exercised in a relatively complex manner using a plurality of acceleration sensors.

Given this background, it is an object of the present invention to provide a method which, in a simple way, contributes to suppression of steering-torque disturbances produced by the action of an active differential.

SUMMARY OF THE INVENTION

The method according to the invention is used to compensate for steering-torque disturbances on a motor vehicle with front-wheel drive or all-wheel drive and an active differential in the drive line of the front wheels and with an active steering-servo device. The method comprises the following steps: determining the torque distribution between the front wheels resulting from the active differential; determining the total torque output by the engine to the driven front wheels; and determining a compensation torque from the torque distribution and the total torque and exertion of this compensation torque by the steering-servo device. The compensation torque compensates completely or partially for disturbing forces on the steering system due to unequal torque distribution.

The method according to the invention provides a simple way of suppressing steering-torque disturbances which may arise due to the action of an active differential when cornering or when the friction coefficients of the surfaces under the two front wheels are different, for example. In the simplest case, the method manages simply with the devices that are already present in any case in a motor vehicle with an active differential and a steering-servo device.

Thus, the torque distribution between the front wheels performed by the active differential is preferably determined from the control signals of this differential. In this case, it is not necessary to provide further sensors or measuring devices for determination of the resulting torque distribution, thereby reducing the outlay required for implementation of the method accordingly. Any slight discrepancy between the actual torque distribution and the desired values selected does not lead to any significant disadvantages.

In a similar way, the total torque is preferably determined from the data available in an engine control unit (specified target values and/or measured values). In this case too, it is possible to dispense with complex metrological determination of the total torque.

The invention also is directed to a motor vehicle comprising: an engine monitored by an engine control unit, an active differential, which connects the engine to the front wheels and which is monitored by a differential control unit, and a steering-servo device for producing a servo-steering torque on the steering system of the front wheels, which is monitored by a steering-servo control unit.

The steering-servo control unit is coupled to the engine control unit and the differential control unit and is designed to perform the method of the present invention. The steering-servo control unit detects the torque distribution between the front wheels performed by the active differential and the total torque output by the internal combustion engine and determines therefrom a compensation torque. The compensation torque is then exerted on the steering system by means of the steering-servo device. In this way, disturbing influences on the steering system arising from unequal torque distribution at the front wheels can be compensated.

Figure 2:
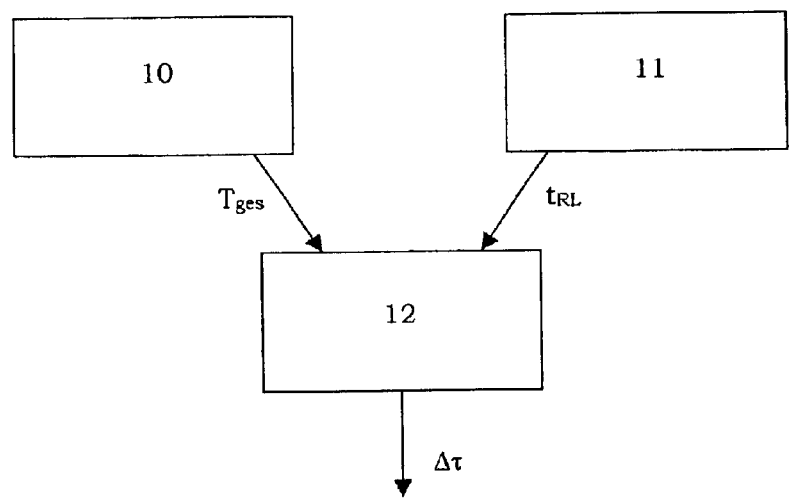

The invention is explained in greater detail below by way of example, with reference to the drawings, in which FIG. 1 shows schematically the force relationships at the front axle of a motor vehicle according to the invention; and FIG. 2 shows a schematic diagram relating to the determination of the compensation torque for the steering system.

DETAILED DESCRIPTION OF THE PREFERRED EMBODIMENTS

FIG. 1 shows in a schematic plan view a driven front axle of a motor vehicle. The driven front axle comprises the left-hand front wheel 1 and the right-hand front wheel 4, which are driven by an internal combustion engine (not shown) via an active front differential 3. The front wheels 1 and 4 can furthermore be steered by means of a steering system 5, the straight-ahead position being illustrated in the figure. An electric motor 6 acts on the steering system 5 to provide electrically driven steering assistance.

In normal straight-ahead driving or when the differential is not locked or activated, forces $F_L$, $F_R$ of equal magnitude act on the right-hand and the left-hand front wheels 1 and 4, respectively. In this case, no disturbing torque is exerted on the steering system 5.

When the differential 3 is locked, however, or when the intention is to apply unequally distributed torque to the right-hand and the left-hand front wheels 1 and 4, a difference between the force $F'_L$ on the left-hand front wheel 1 and the force $F'_R$ on the right-hand front wheel 4 may arise, when cornering or on surfaces with different frictional properties under the two front wheels 1, 4, for example. These forces of different magnitude then lead to a corresponding disturbing torque in the steering system 5 via the steering lever 2.

With the present invention, it is possible to completely or at least partially compensate for such steering-torque disturbances in a simple way. According to the schematic control diagram in FIG. 2, the total torque $T_{ges}$ from the engine control unit 10 and the torque distribution $t_{LR}$ between the right-hand and the left-hand front wheels 1, 4 are read out for this purpose from the control unit 11 of the active front differential 3 and fed to the control unit 12 for the steering-servo device 6. Given the size of the steering lever 2 of the front-wheel suspension, the steering-servo control unit 12 can use the two the variables $T_{ges}$ and $t_{LR}$ to calculate a compensation torque $\Delta\tau$, which completely or partially compensates for the steering-torque disturbance caused by the active differential 3. The steering-servo control unit 12 then uses this calculated compensation torque $\Delta\tau$ to control the steering-servo device 6, which exerts a corresponding compensating auxiliary steering torque. In this way, the steering-torque disturbances perceived by the driver can be minimized.

What is claimed is:

1. A method for compensating steering-torque disturbances on a motor vehicle having front-wheel drive or all-wheel drive, an active differential in the drive line of the front wheels and an active steering-servo device, comprising the steps of:

a) determining a torque distribution ($t_{LR}$) between the front wheels brought about by the active differential;

b) determining a total torque ($T_{ges}$) output to the front wheels; and c) determining a compensation torque ($\Delta\tau$) from the torque distribution ($t_{LR}$) and the total torque ($T_{ges}$) exerted on the steering system by the steering-servo device so as to compensate for disturbing forces due to unequal torque distribution.

2. The method as claimed in claim 1, wherein the step of determining the torque distribution ($t_{LR}$) between the front wheels resulting from the active differential is determined from the control of the differential.

3. The method as claimed in claim 2, wherein the step of determining the the total torque ($T_{ges}$) is determined from the data from an engine control unit.

4. A motor vehicle having front-wheel drive or all-wheel drive and an internal combustion engine monitored by an engine control unit, comprising:

an active differential which connects the internal combustion engine to a pair front wheels and which is monitored by a differential control unit; and a steering-servo unit for producing a servo-steering torque on a steering system of the front wheels and which is monitored by a steering-servo control unit, whereby the steering-servo control unit is coupled to the engine control unit and the differential control unit and is operative to determine a compensation torque ($\Delta\tau$) from the torque distribution ($t_{LR}$) and the total torque ($T_{ges}$) exerted on the steering system so as to compensate for disturbing forces due to unequal torque distribution.

* * * * *